United States Patent
Shin

(10) Patent No.: US 12,273,603 B2
(45) Date of Patent: Apr. 8, 2025

(54) CROWD SOURCE-BASED TIME MARKING OF MEDIA ITEMS AT A PLATFORM

(71) Applicant: Google LLC, Mountain View, CA (US)

(72) Inventor: Dongeek Shin, San Jose, CA (US)

(73) Assignee: Google LLC, Mountain View, CA (US)

( * ) Notice: Subject to any disclaimer, the term of this patent is extended or adjusted under 35 U.S.C. 154(b) by 121 days.

(21) Appl. No.: 17/746,816

(22) Filed: May 17, 2022

(65) Prior Publication Data

US 2023/0379556 A1  Nov. 23, 2023

(51) Int. Cl.
| | |
|---|---|
| H04N 21/45 | (2011.01) |
| H04N 21/472 | (2011.01) |
| H04N 21/845 | (2011.01) |
| H04N 21/8547 | (2011.01) |

(52) U.S. Cl.
CPC ..... *H04N 21/8547* (2013.01); *H04N 21/4532* (2013.01); *H04N 21/472* (2013.01); *H04N 21/8455* (2013.01)

(58) Field of Classification Search
None
See application file for complete search history.

(56) References Cited

U.S. PATENT DOCUMENTS

| | | | |
|---|---|---|---|
| 9,396,180 B1 | 7/2016 | Salvador et al. | |
| 2003/0093790 A1 | 5/2003 | Logan et al. | |
| 2013/0046773 A1* | 2/2013 | Kannan | H04N 21/4788 |
| | | | 707/754 |
| 2013/0145385 A1* | 6/2013 | Aghajanyan | H04N 21/4667 |
| | | | 725/10 |
| 2014/0068670 A1 | 3/2014 | Timmermann et al. | |
| 2015/0046951 A1 | 2/2015 | Arunachalam et al. | |
| 2015/0100993 A1* | 4/2015 | Lee | H04L 67/142 |
| | | | 725/90 |
| 2017/0257410 A1* | 9/2017 | Gattis | H04N 21/4788 |
| 2018/0098101 A1* | 4/2018 | Pont | H04N 21/44204 |
| 2019/0306550 A1 | 10/2019 | Thörn et al. | |
| 2022/0215065 A1 | 7/2022 | Shetty et al. | |
| 2022/0303632 A1 | 9/2022 | El Ghazzal | |

\* cited by examiner

*Primary Examiner* — Jefferey F Harold
*Assistant Examiner* — Charles N Hicks
(74) *Attorney, Agent, or Firm* — Lowenstein Sandler LLP

(57) ABSTRACT

Methods and systems for crowd source-based time marking of media items at a platform are provided herein. A media item is provided to first client devices associated with first users of a platform. An indication is received from each of the first client devices of an interesting content segment of the media item as selected by a first user of the platform. At least one content segment of the media item to be associated with a bookmark for a timeline of the media item is determined. The at least one content segment is determined in view of the indication received from each of the first client devices. The media item and the indication of the bookmark is provided to a second client device for presentation to a second user of the platform.

20 Claims, 9 Drawing Sheets

CROWD SOURCE-BASED TIME MARKING OF MEDIA ITEMS AT A PLATFORM

TECHNICAL FIELD

Aspects and implementations of the present disclosure relate to crowd source-based time marking of media items at a platform.

BACKGROUND

A platform (e.g., a content platform) can transmit (e.g., stream) media items to client devices connected to the platform via a network. A media item can include a video item and/or an audio item, in some instances. Users can consume the transmitted media items via a user interface (UI) provided by the platform. In some instances, one or more content segments of a media item may be more interesting to a user than other content segments. The user may wish to easily access the interesting content segment(s) of the media item without consuming the entire media item via the UI.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for crowd source-based time marking of media items at a platform. In an implementation, a method includes providing a media item to first client devices associated with first users of a platform. The method further includes receiving, from each of the first client devices, an indication of an interesting content segment of the media item as selected by a respective first user of the platform. The method further includes determining at least one content segment of the media item to be associated with a bookmark for a timeline of the media item. The at least one content segment is determined in view of the indication received from each of the first client devices. The method further includes providing the media item and an indication of the bookmark to a second client device for presentation to a second user of the platform.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
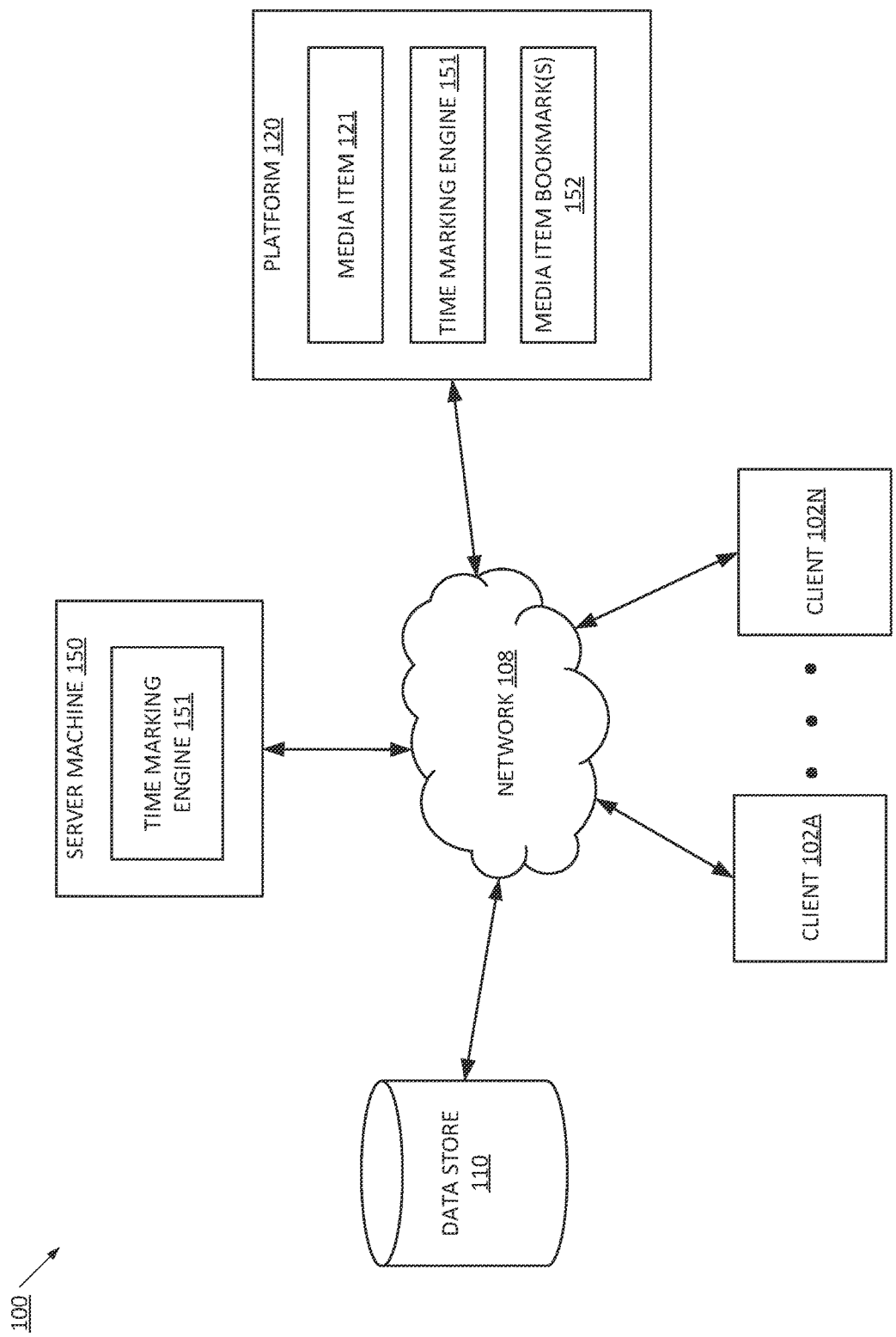
FIG. 1 illustrates an example system architecture, in accordance with implementations of the present disclosure.

Aspects of the present disclosure relate to crowd source-based time marking of media items at a platform. A platform (e.g., a content platform, etc.) can enable a user to access a media item (e.g., a video item, an audio item, etc.) provided by another user of the platform. For example, a first user of a content platform can provide (e.g., upload) a media item to a content platform to be available to other users of the platform. A second user of the content platform can access the media item provided by the first user via a user interface (UI) provided by the content platform at a client device associated with the second user. In some instances, a media item can include one or more content segments. In a first example, if the media item includes video content relating to an academic lecture, a first content segment of the media item can depict a discussion of a first topic of the lecture and a second content segment of the media item can depict a discussion of a second topic of the lecture. In a second example, if the media item includes video content and/or audio content relating to a music concert, a first content segment can depict a performance of a first song performed at the music concert and a second content segment can depict a performance of a second song performed at the music concert.

In conventional systems, a creator of a media item (e.g., the first user) can provide to the platform an indication of respective content segments of a media item that the creator wishes to highlight for users of the platform (e.g., the second user). In accordance with the first example, the first user can provide to the content platform an indication of a first time period of a timeline of the media item that corresponds to the first content segment depicting the discussion of the first topic of the lecture and another indication of a second time period of the media item timeline that corresponds to the second content segment depicting the discussion of the second topic of the lecture. The platform UI that is provided to the second user accessing the media item can include a UI element (e.g., a bookmark UI element) indicating the first time period corresponding to the first content segment highlighted by the first user and/or the second time period corresponding to the second content segment highlighted by the first user. The second user can cause the first segment and/or the second content segment to be displayed via the platform UI by engaging (e.g., clicking, selecting, tapping, etc.) with the UI element. Accordingly, the second user can access the first content segment and/or the second content segment (e.g., the segments that are highlighted by the first user) without consuming the entire media item. In accordance with the second example, the first user can provide an indication of a first time period of the media item timeline at which the performance of the first song begins and/or another indication of a second time period of the media item timeline at which the performance of the second song begins. The platform UI at the client device associated with the second user can include a UI element indicating the first time period and/or the second time period, as described above.

It can take a significant amount of time and computing resources for a media item creator to determine which content segments to highlight for users and to provide an indication of such content segments to a platform. For example, the academic lecture depicted by the media item can be significantly long (e.g., can last one hour, two hours or more, etc.) and can cover a large number of topics. It can take a significant amount of time for the media item creator to consume the media item, accurately determine a respective time period of the media item timeline that corresponds to a respective topic, and provide an indication of the content segment at the determined respective time period to the platform. The media item creator may consume one or more portions of the media item several times in order to accurately identify the time period that corresponds to a respective topic. Computing resources of the client device that enable the media item creator to access the media item and/or computing resources of the platform can be unavailable for other processes, which can decrease overall efficiency and increase overall latency of the client device. In addition, the creator of the media item may not know at the time that the media item is provided to the platform which content segments are to be particularly interesting to users accessing the media item. In such instances, the media item creator may select one or more respective content segments of the media item to highlight for users accessing the media item (e.g., in view of what the media item creator expects the users to find interesting). However, no users, or a very few number of users, may find the respective content segments to be interesting. Accordingly, the amount of time and computing resources consumed by client devices associated with the media item creator and/or the users to highlight such content segments is wasted, as described above.

Even if the media item creator can accurately highlight content segments that are interesting to users at the time that the media item is provided to the platform, the users may not find such highlighted content segments interesting after the media item is available for a significant length of time. For example, users may find that a highlighted content segment is interesting for approximately a year after the media item is accessible via the platform and therefore may engage with the UI element associated with the highlighted content segment to directly access the highlighted content segment. However, over time (e.g., after approximately a year after the media item is accessible via the platform), users may find that another content segment of the media item is particularly interesting. Accordingly, the content segments highlighted by the media item may no longer be interesting and/or relevant to the users and the users may no longer engage with the UI element associated with the highlighted content segment(s), rendering the UI element ineffective.

Aspects of the present disclosure address the above and other deficiencies by providing techniques for crowd source-based time marking of media items at a platform. A media item creator can provide a media item to a platform for access by users (e.g., first users) of the platform. The media item can correspond to a video item and/or an audio item. First users can access the media item via a UI provided by the platform to client devices associated with the first users. In one or more examples, the first users can be the intended users for consumption of the content of the media item. For example, if the media item depicts an academic lecture, the first users can be students that are accessing the academic lecture (e.g., for an academic course, etc.). At the time the first users access the media item, the media item may not be associated with any bookmarks.

The platform UI can include one or more UI elements, which allow the first users to provide an indication of a time period of a timeline of the media item that includes content segments that the first users find interesting (referred to herein as a time mark). While a respective first user consumes the media item via the platform UI, the respective first user can engage with (e.g., click, tap, select, etc.) the one or more UI elements to provide to the platform an indication of a time mark for a content segment of the media item that the respective first user finds interesting. The platform can receive indications of time marks from client devices associated with each of the first users and can track a number of time marks received for each content segment of the media item. In some embodiments, the platform can maintain a histogram data structure associated with the media item, which includes one or more data points indicating time marks received for each respective time period of the media item. The platform can track the number of time marks provided for each respective content segment of the media item by updating the histogram data structure to include one or more data points each corresponding to the time marks, in accordance with embodiments described herein.

The platform can determine at least one content segment of the media item to be associated with a bookmark for the media item timeline in view of the time marks received for the media item. A bookmark refers to an indication of a content segment that is expected to be interesting to users of the platform. In an illustrative example, each of the first users can provide an indication of time marks for a particular content segment of the media item that the first users find interesting. Since the first users may not be concerned with the accuracy of the placement of each time mark, the indicated time marks for the particular content segment may not directly correspond to an initial time period for the particular content segment on the media item timeline. For instance, some of the first users may provide an indication for a time mark at a time period that is slightly before (e.g., one or more seconds before, one or more milliseconds before, etc.) the initial time period of the particular content segment. Other first users may provide an indication for a time mark at a time period that is slightly after (e.g., one or more seconds after, one or more milliseconds after, etc.) the initial time period of the particular content segment. The platform can determine one or more respective content segments to be associated with the bookmark for the media item timeline based on an analysis of the indications of the time marks received from client devices associated with each of the first users. The platform can store an indication of the bookmark associated with the one or more content segments at a storage associated with the platform. Further details regarding determining one or more content segments to be associated with a bookmark for a media item timeline are provided herein.

The platform can receive a request from a second client device associated with a second user of the platform to access the media item (e.g., upon determining the one or more content segments associated with the bookmark). The platform can provide the media item and an indication of the bookmark to the second client device for presentation to the second user via the platform UI. The platform UI can include one or more UI elements corresponding to the indicated bookmark at a portion of a timeline for the media item that corresponds to the time period that includes the respective content segment. Responsive to detecting that the user has engaged with the UI element corresponding to a bookmark, the platform can initiate playback of the respective content segment via the platform UI. Accordingly, the second user can access the content segment highlighted as interesting by the first users of the platform without consuming the entire media item.

Aspects of the present disclosure cover techniques to enable users of a platform accessing a media item to provide indications of time marks for interesting content segments of the media item. The platform can associate the interesting content segments of the media item with one or more bookmarks, which enable other users of the platform to easily access the interesting content segments without consuming the entire media item. By enabling the users of the platform to provide indications of time marks for interesting content segments of a media item, it is not necessary for a creator associated with the media item to consume the media item (sometimes multiple times) to identify content segments that the creator thinks will be interesting to users and to accurately designate such content segments to be associated with one or more bookmarks. Accordingly, computing resources at a client device associated with the media item creator and/or the platform are available for other processes, which increases an overall efficiency and decreases an overall latency for the system. Further, embodiments of the present disclosure enable a user to access content segments that other users of the platform find to be interesting and the user does not need to consume an entire media item to identify interesting content segments. As user tastes and interests may change, user provided time marks may also be updated to indicate content segments that are relevant and/or interesting to users over time. Accordingly, bookmarks provided to users with access to media items can evolve to account for the updated time marks. Thus, an amount of computing resources of client devices associated with media item creators and/or platform users is reduced, as it is not necessary for the media item creators to revisit each media item provided to the platform to update such bookmarks and it is not necessary for platform users to consume multiple content segments to identify relevant and interesting content.

FIG. 1 illustrates an example system architecture 100, in accordance with implementations of the present disclosure. The system architecture 100 (also referred to as "system" herein) includes client devices 102A-N, a data store 110, a platform 120, and/or a server machine 150 each connected to a network 108. In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more portions of a document and/or a file displayed via a graphical user interface (GUI) on a client device 102, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 108.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Client devices 102A-N can include a content viewer. In some implementations, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital media items, etc.) served by a web server. The content viewer can render, display, and/or present the content to a user. The content viewer can also include an embedded media player (e.g., a Flash® player or an HTML5 player) that is embedded in a web page (e.g., a web page that may provide information about a product sold by an online merchant). In another example, the content viewer can be a standalone application (e.g., a mobile application or app) that allows users to view digital media items (e.g., digital video items, digital images, electronic books, etc.). According to aspects of the disclosure, the content viewer can be a content platform application for users to record, edit, and/or upload content for sharing on platform 120. As such, the content viewers and/or the UI associated with the content viewer can be provided to client devices 102A-N by platform 120. In one example, the content viewers may be embedded media players that are embedded in web pages provided by the platform 120.

A media item 121 can be consumed via the Internet or via a mobile device application, such as a content viewer of client devices 102A-N. In some embodiments, a media item 121 can correspond to a media file (e.g., a video file, an audio file, a video stream, an audio stream, etc.). In other or similar embodiments, a media item 121 can correspond to a portion of a media file (e.g., a portion or a chunk of a video file, an audio file, etc.). As discussed previously, a media item 121 can be requested for presentation to the user by the user of the platform 120. As used herein, "media," "media item," "online media item," "digital media," "digital media item," "content," and "content item" can include an electronic file that can be executed or loaded using software, firmware or hardware configured to present the digital media item to an entity. As indicated above, the platform 120 can store the media items 121, or references to the media items 121, using the data store 110, in at least one implementation. In another implementation, the platform 120 can store media item 121 or fingerprints as electronic files in one or more formats using data store 110. Platform 120 can provide media item 121 to a user associated with a client device 102A-N by allowing access to media item 121 (e.g., via a content platform application), transmitting the media item 121 to the client device 102, and/or presenting or permitting presentation of the media item 121 via client device 102.

In some embodiments, media item 121 can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, or any set of images (e.g., animated images, non-animated images, etc.) to be displayed in sequence. In some embodiments, a video item can be stored (e.g., at data store 110) as a video file that includes a video component and an audio component. The video component can include video data that corresponds to one or more sequential video frames of the video item. The audio component can include audio data that corresponds to the video data.

Platform 120 can include multiple channels (e.g., channels A through Z). A channel can include one or more media items 121 available from a common source or media items 121 having a common topic, theme, or substance. Media item 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

In some embodiments, system 100 can include one or more third party platforms (not shown). In some embodiments, a third party platform can provide other services associated media items 121. For example, a third party platform can include an advertisement platform that can provide video and/or audio advertisements. In another example, a third party platform can be a video streaming service provider that produces a media streaming service via a communication application for users to play videos, TV shows, video clips, audio, audio clips, and movies, on client devices 102 via the third party platform.

In some embodiments, a client device 102 can transmit a request to platform 120 for access to a media item 121. Platform 120 may identify the media item 121 of the request (e.g., at data store 110, etc.) and may provide access to the media item 121 via the UI of the content viewer provided by platform 120. In some embodiments, the requested media item 121 may have been generated by another client device 102 connected to platform 120. For example, client device 102A can generate a video item (e.g., via an audiovisual component, such as a camera, of client device 102A) and provide the generated video item to platform 120 (e.g., via network 108) to be accessible by other users of the platform. In other or similar embodiments, the requested media item 121 may have been generated using another device (e.g., that is separate or distinct from client device 102A) and transmitted to client device 102A (e.g., via a network, via a bus, etc.). Client device 102A can provide the video item to platform 120 (e.g., via network 108) to be accessible by other users of the platform, as described above. Another client device, such as client device 102N, can transmit the request to platform 120 (e.g., via network 108) to access the video item provided by client device 102A, in accordance with the previously provided examples.

In some embodiments, the UI of the content viewer provided by platform 120 (referred to simply as platform UI herein) may include one or more UI elements that enable a user to control a playback of the media item 121 via the content viewer. For example, the platform UI may include one or more UI elements that enable the user to initiate playback of the media item 121 (e.g., a "play" button) and/or pause playback of the media item 121 (e.g., a "pause" button). In another example, the platform UI may include one or more UI elements that enable the user to initiate playback of another media item 121 that is related to the requested media item 121 (e.g., a "next" button). The platform UI may further include one or more UI elements that indicates a timeline of the media item 121 and/or a progress of the playback of the media item 121 within the timeline.

In accordance with embodiments of the present disclosure, the platform UI may also include one or more UI elements that enable a user to provide a time mark for a time period of the timeline of the media item 121. A time mark refers to a marking or an indication of a time period of the time line of the media item 121 that includes a segment of content that a user accessing the media item 121 finds to be interesting. In an illustrative example, as a user is accessing a media item 121 via the content viewer, the user can engage (e.g., click, select, tap, etc.) with such UI element(s) to provide an indication of a particular time period of the timeline of the media item 121 that includes a segment of content that the user finds to be interesting. The client device 102 associated with the user can detect that the user has provided a time mark for the particular time period of the timeline and can transmit (e.g., via network 108) an indication of the time mark to platform 120. Further details regarding the platform UI and the time marking UI elements are provided with respect to FIGS. 3A-3C.

As illustrated in FIG. 1, platform 120 can include a time marking engine 151. Time marking engine 151 can be configured to determine, based on indications of time marks received from one or more of client devices 102, a segment of content of the media item 121 that is interesting to users of platform 120 and provide one or more media item bookmark(s) 152 (referred to simply as "bookmark(s)" herein) indicating the interesting content segment to other users of the platform 120 that request to access the media item 121. For purposes of explanation and clarification only, a time mark refers to an indication of a time period of a timeline of media item 121 that includes an interesting content segment, while bookmark refers to an indication of the interesting content segment that is provided via the UI of the content viewer provided by platform 120.

In accordance with the previous illustrative example, time marking engine 151 can receive indications of time marks for a media item 121 from one or more client devices 102. In response to receiving such indications, time marking engine 151 can determine one or more content segments of the media item 121 that correspond to the indicated time marks. In some instances, one or more time marks can correspond to a time period of the media item timeline that is slightly before (e.g., one or more seconds before, one or more milliseconds before, etc.) or slightly after (e.g., one or more seconds after, one or more milliseconds after, etc.) an initial period for a particular content segment of the media item 121. Time marking engine 151 can determine, in view of indicated time marks that surround the initial period for the particular content segment, that the particular content segment is interesting to the users of the platform 120. Accordingly, time marking engine 151 can generate one or more bookmarks 152 indicating the initial period for the interesting content segment and can provide an indication of the one or more bookmarks 152 with the media item 121 to another client device 102 requesting to access media item 121. In some embodiments, time marking engine 151 can store an indication of the one or more bookmarks 152 at data store 110. Further details regarding determining an interesting content segment based on the one or more time marks and generating bookmark(s) 152 are provided with respect to FIG. 4.

As indicated above, after time marking engine 151 generates one or more bookmarks 152 for a media item 121, another client device 102 can request access to the media item 121. Platform 120 can provide the other client device 102 with access to the media item 121 via the content viewer, as described above. Platform 120 can also transmit an indication of the bookmark(s) 152 associated with media item 121 to the other client device 102, in some embodiments. In other or similar embodiments, the other client device 102 can obtain an indication of the bookmark(s) 152 via data store 110. In response to obtaining the indication of the bookmark(s) 152 (e.g., either from platform 120 or via data store 110), the other client device 102 can update the platform UI to include one or more UI elements indicating the bookmarks(s) 152 for the media item 121. For example, the other client device 102 can include one or more UI elements that indicate a time period of the timeline for the media item 121 that corresponds to the bookmark(s) 152. Responsive to detecting that the user of the other client device 102 has engaged with (e.g., clicked, selected, tapped, etc.) the one or more UI elements, the content viewer can initiate playback of the one or more interesting content segments of the media item 121. Accordingly, the user of the other client device 102 can access the one or more interesting content segments of the media item 121 without consuming the entire media item 121. Further details regarding the one or more UI elements that enable playback of the interesting content segment(s) of the media item 121 are provided with respect to FIG. 5.

It should be noted that although FIG. 1 illustrates time marking engine 151 as part of platform 120, in additional or alternative embodiments, time marking engine 151 can reside on one or more server machines that are remote from platform 120 (e.g., server machine 150). In some embodiments, media item management component 122 can transmit data associated with one or more edits to time marking engine 151 (e.g., via network 108, via a bus, etc.) residing on server machine 150.

It should be noted that in some other implementations, the functions of server machine 150 and/or platform 120 can be provided by a fewer number of machines. For example, in some implementations components and/or modules of server machine 150 may be integrated into a single machine, while in other implementations components and/or modules of server machine 150 may be integrated into multiple machines. In addition, in some implementations components and/or modules of server machine 150 may be integrated into platform 120.

In general, functions described in implementations as being performed by platform 120 and/or server machine 150 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of platform 120 and users of platform 120 accessing an electronic document, implementations can also be generally applied to any type of documents or files. Implementations of the disclosure are not limited to electronic document platforms that provide document creation, editing, and/or viewing tools to users. Further, implementations of the disclosure are not limited to text objects or drawing objects and can be applied to other types of objects.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
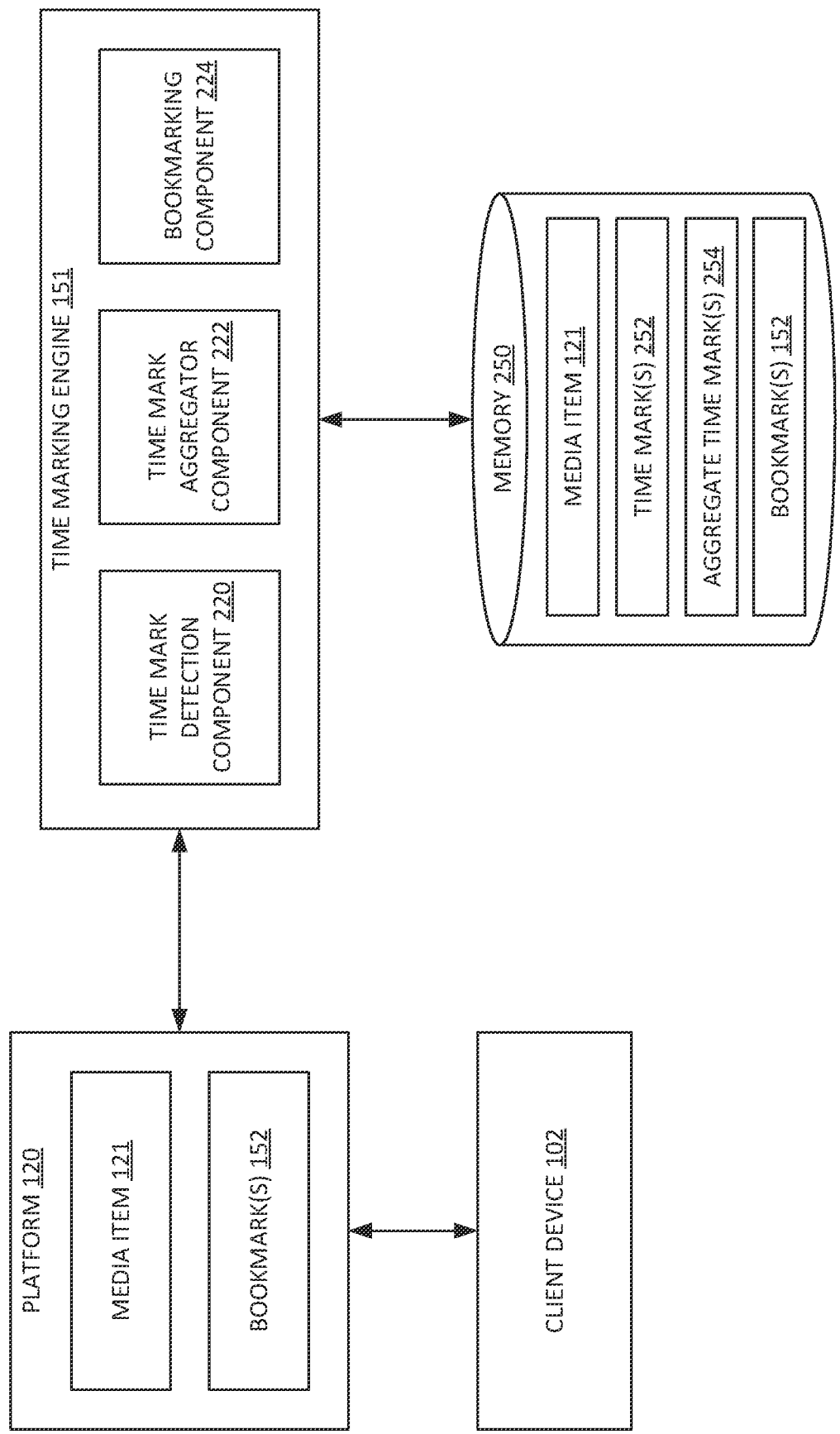
FIG. 2 is a block diagram illustrating an example platform and an example time marking engine, in accordance with implementations of the present disclosure.

FIG. 2 is a block diagram illustrating an example platform 120 and an example time marking engine 151, in accordance with implementations of the present disclosure. As described with respect to FIG. 1, platform 120 can provide users with access to media item(s) 121 hosted by platform 120. In some embodiments, media item (s) 121 can be provided to platform 120 by other users of platform 120. In such embodiments, platform 120 can be a content platform. As described above, a user can access a media item 121 via a UI of a content viewer of a client device 102 associated with the user. In some embodiments, the content viewer can be provided by platform 120. In an illustrative example, client device 102 can transmit a request to access a particular media item 121 hosted by platform 120 (e.g., in response to a user selection, etc.). Platform 120 can identify the particular media item 121 (e.g., from one or more media files residing at data store 110) and can provide access to the particular media item 121 via the content viewer, as described above.

Figure 3A:
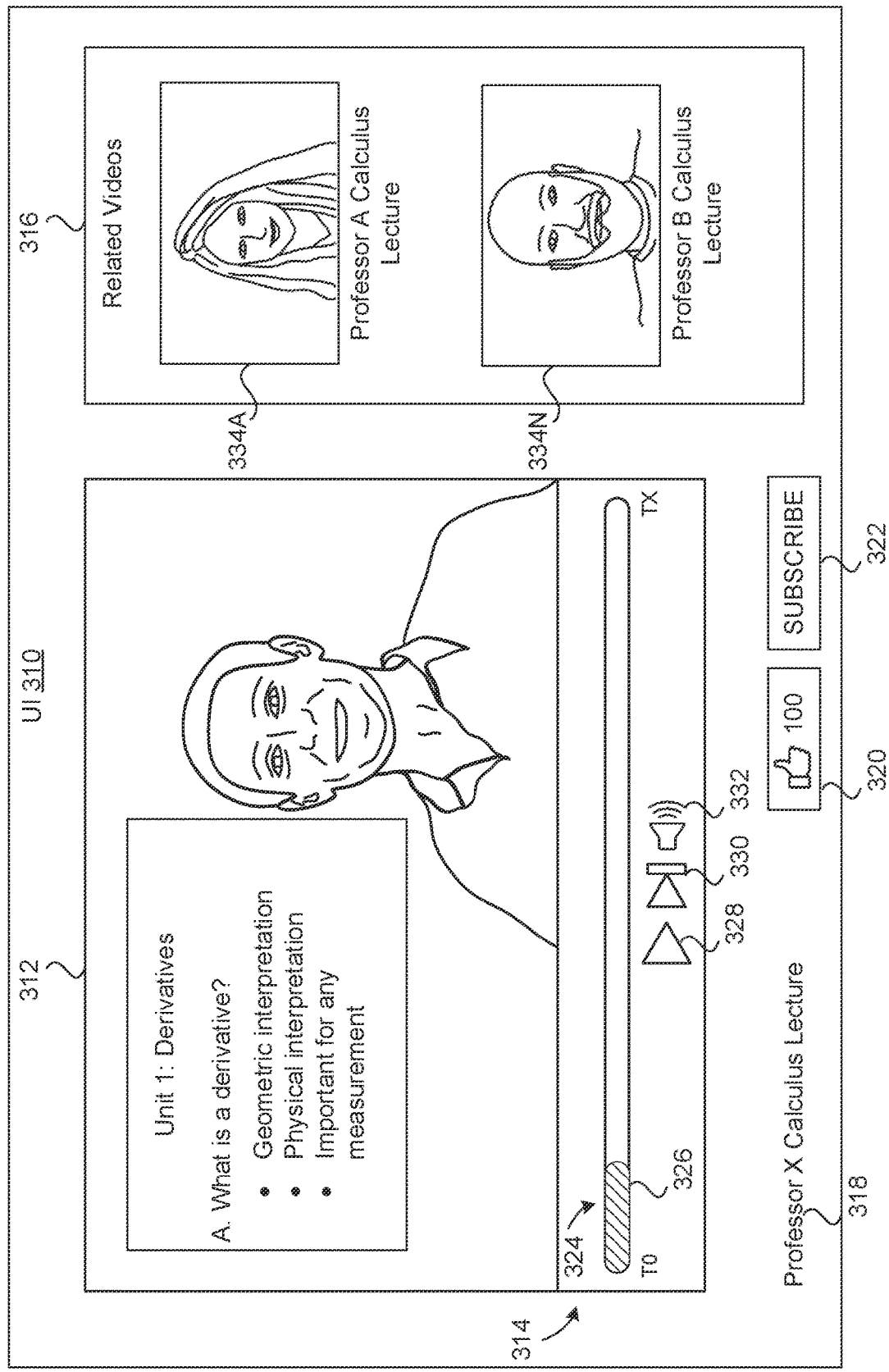
FIG. 3A-3C illustrate an example of crowd source-based time marking of a media item, in accordance with implementations of the present disclosure.

FIG. 3A illustrates an example of a UI 310 of a content viewer provided by platform 120, in accordance with implementations of the present disclosure. In some embodiments, UI 310 can include one or more of a first section 312, a second section 314, and/or a third section 316. In some embodiments, the first section 312 can be configured to display a media item 121 (e.g., for consumption by one or more users of a client device 102). In an illustrative example, media item 121 can include video content and/or audio content relating to an academic lecture (e.g., a calculus lecture). Platform 120 can provide playback of the media item 121 via the first section 312 of UI 310, in some embodiments.

Second section 314 of UI 310 can include one or more UI elements that enable a user of client device 102 to control playback of the media item 121 via the first section 312 of UI 310 and/or provide an indication of metadata associated with the media item 121. As illustrated in FIG. 3A, second section 314 can include one or more UI elements 318 that indicate a title associated with media item 121 (e.g., "Professor X Calculus Lecture"). Second section 314 can additionally or alternatively include one or more elements that enable the user to engage with the media item 121. For example, second section 314 can include one or more UI elements 320 that enable the user to endorse (e.g., "like") the media item 121 and/or one or more UI elements 322 that enable the user to subscribe to a channel associated with the media item 121. UI elements 320 and/or UI elements 322 can additionally or alternatively include information indicating a number of other users that have endorsed the media item 121 and/or have subscribed to a channel associated with the media item 121.

In some embodiments, second section 314 can include one or more UI elements 324 that indicate a timeline associated with the media item 121. A timeline associated with a media item can correspond to a length of a playback of the media item 121. In an illustrative example, playback of media item 121 can be initiated at time T0 (e.g., seconds, minutes, hours, etc.) and can be completed at time TX (e.g., seconds, minutes, hours, etc.). Accordingly, the length of the playback of media item 121 can have a value of X (e.g., seconds, minutes, hours, etc.). As illustrated in FIG. 3A, UI elements 324 indicate that the playback of the video is initiated at an initial time period of the timeline (e.g., at time T0) and playback of the video is completed at a final time period of the timeline (e.g., at time TX).

Second section 314 can also include one or more UI elements 326 that indicate a progress of the playback of media item 121 via the first section 312 of UI 310 in view of the timeline of media item 121. One or more characteristics of UI elements 326 (e.g., size, shape, etc.) can change as playback progresses along the timeline of the media item 121. For example, as playback progresses along the timeline of the media item 121 (e.g., from the initial time period at time T0 to the final time period at time TX), the size of UI element(s) 326 can change to indicate time periods of the timeline that include content segments of which playback has been completed. In an illustrative example, UI element(s) 326 can include a timeline progress bar. A size of the progress bar can grow as playback progresses along the timeline of the media item 121 from the initial time period to the final time period. In some embodiments, a user can select (e.g., click, tap, etc.) a portion of UI element(s) 324 that corresponds to a particular time period of the timeline of media item 121. In response to detecting the user selection, the content viewer can initiate playback of a content segment of the media item 121 that is associated with the particular time period. Platform 120 can update UI element(s) 326 to have a size that corresponds to the particular time period of the timeline that includes the initiated content segment.

Second section 314 can include additional elements that enable a user of client device 102 to control playback of media item 121 via the first section 312 of UI 310. For example, second section 314 can include one or more UI elements 328 that enable a user to initiate playback and/or stop playback of one or more content segments of media item 121. Second section 314 can additionally or alternatively include one or more UI elements 330 that enable the user to terminate playback of the media item 121 and initiate playback of another media item 121. For example, UI element(s) 330 can enable the user to terminate playback of the media item 121 and initiate playback of another media item 121 that is included in a channel associated with the media item 121 and/or is provided by the same creator as the media item 121. In another example, UI element(s) 330 can enable the user to terminate playback of the media item 121 and initiate playback of another media item 121 that is otherwise related to media item 121 (e.g., media item(s) 334 included in third section 316, described below).

In some embodiments, third section 316 can include an indication of one or more additional media items (illustrated in FIG. 3A as media items 334A-334N) that are related to the media item 121 included in first section 312. In some embodiments, the additional media items 334A-N can be included in a channel associated with the media item 121 and/or can be provided to platform 120 by the same creator of media item 121. In other or similar embodiments, the additional media items 334 can have a topic that is the same as or similar to a topic associated with media item 121. For example, as illustrated in FIG. 3A, media item 121 can have a topic of calculus. Third section 316 can include one or more additional media item(s) 334 also having a topic of calculus (e.g., media item 334A having a title of "Professor A Calculus Lecture," media item 334N having a title of "Professor B Calculus Lecture," etc.). In response to a user selection of an additional media item 334 indicated in third section 316, platform 120 can update UI 310 to include the selected additional media item 334 in the first section 312 and, in some embodiments, can initiate playback of the selected additional media item 334.

Figure 3B:
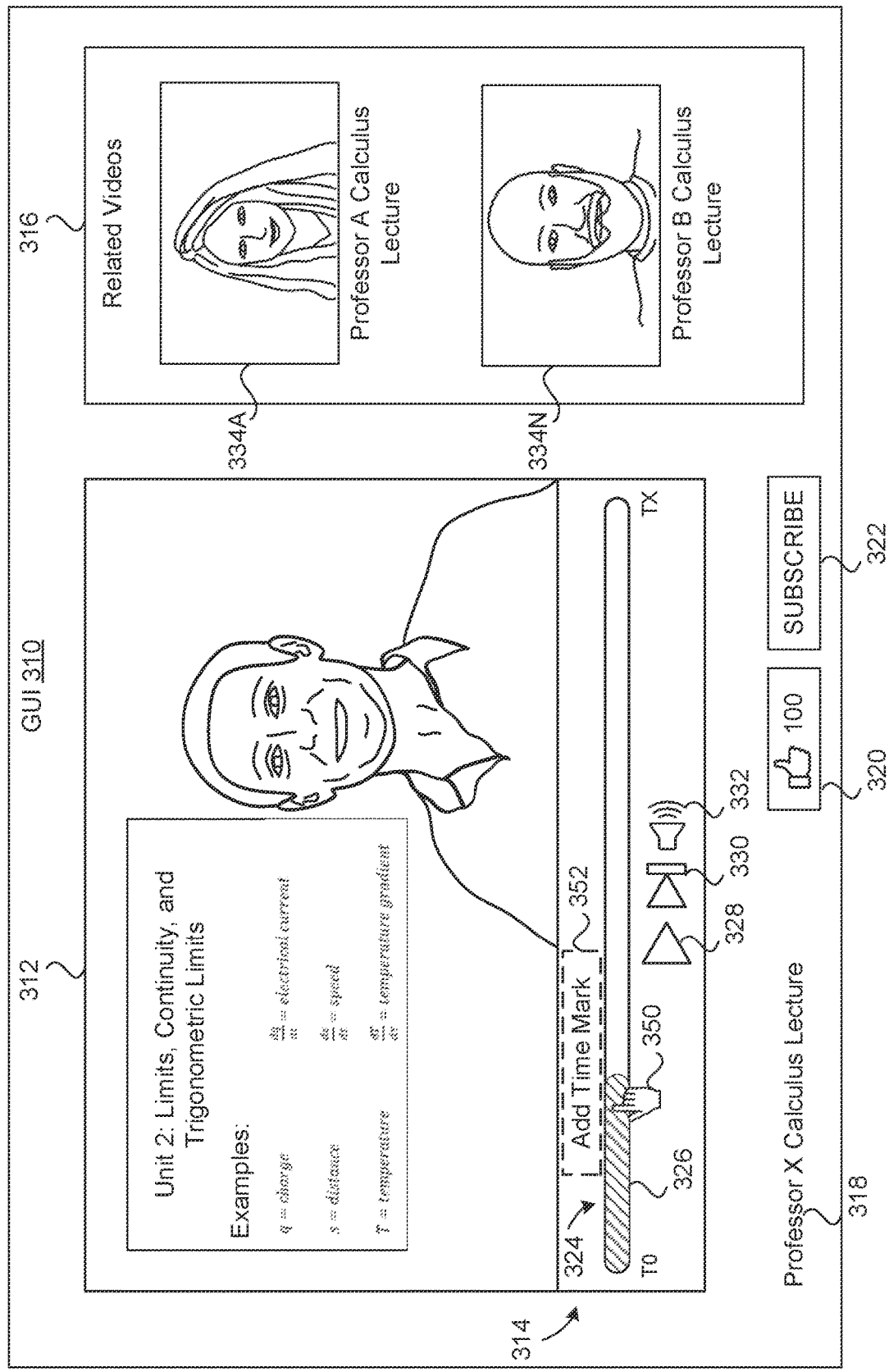

As described above, UI 310 can include one or more UI elements that enable a user to indicate a time period of the timeline of media item 121 that includes an interesting content segment. FIG. 3B illustrates an example of a user engaging with the one or more UI elements to indicate a time period of the timeline of media item 121 that includes an interesting content segment, in accordance with implementations of the preset disclosure. As illustrated in FIG. 3B, a user of client device 102 can provide an indication 350 of a time period of the timeline of UI element(s) 324 that includes an interesting content segment. For example, the user can move a mouse or other device included in or otherwise connected to client device 102 to cause a pointer element of UI 310 to provide the indication 350 of the particular time period of the timeline of UI element(s) 324 that include the interesting content segment. It should be noted that a user can provide the indication 350 of a time period of the timeline of UI element(s) 324 that includes an interesting content segment according to other techniques. For example, the user can tap a portion of a touchscreen included at or otherwise connected to client device 102 to provide the indication 350 of the particular time period of the timeline of UI element(s) 324 that includes the interesting content segment.

Figure 3C:
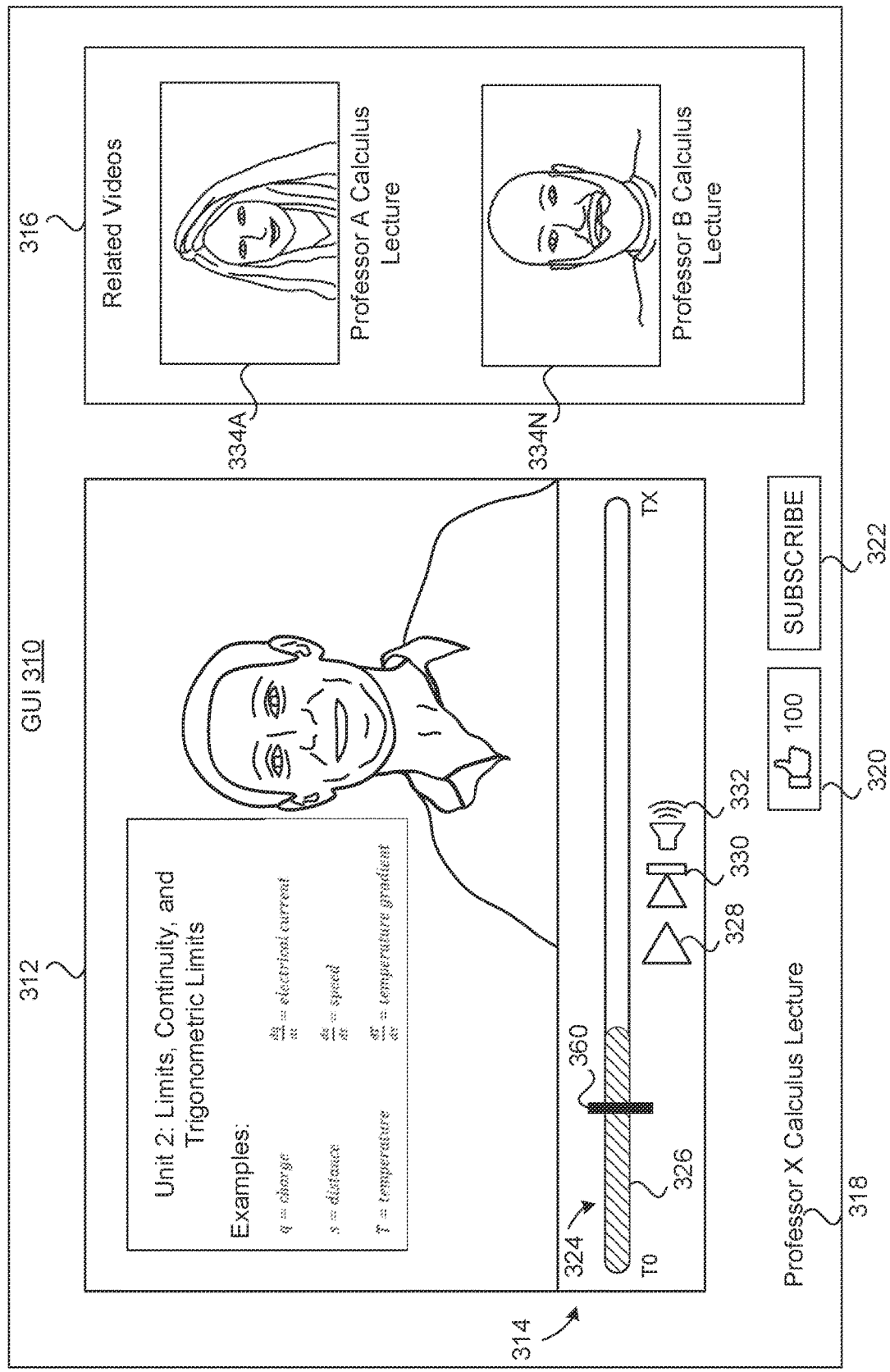

In response to detecting the user provided indication 350 of the particular time period of the timeline of UI element(s) 324 that include the interesting content segment, platform 120 can update UI 310 to include an additional UI element 352 that enables the user to add a time mark at the portion of the time line that corresponds to the indicated time period. In some embodiments, the additional UI element 352 can include a button. The additional UI element 352 can include other types of UI elements, in additional or alternative embodiments. In response to detecting that the user has engaged with (e.g., clicked, selected, tapped, etc.) the additional UI element 352, client device 102 can transmit an indication of the user engagement to platform 120 (e.g., via network 108, via a bus, etc.). Platform 120 can determine that the user wishes to add a time mark to the indicated time period of the timeline of UI element(s) 324. As illustrated in FIG. 3C, platform 120 can update UI 310 to include an indication 360 of the time mark at the portion of UI element(s) 324 that corresponds to the time period of indication 350. It should be noted that in some embodiments, platform 120 may not update UI 310 to include additional element 352 in response to detecting user provided indication 350. Instead, platform 120 may update UI 310 to include the indication 360 of the time mark at the portion of UI element(s) 324 that corresponds to the time period of indication 350 (e.g., without detecting a user engagement with UI element 352).

Referring back to FIG. 2, time marking engine 151 can include one or more of a time mark detection component 220, a time mark aggregator component 222 and/or a bookmarking component 224. In some embodiments, time marking engine 151 can include or can be connected to (e.g., via a network, via a bus, etc.) memory 250. Memory 250 can correspond to data store 110 of FIG. 1, in some embodiments. In other or similar embodiments, memory 250 can include or be connected to a memory device of system 100. In yet other or similar embodiments, memory 250 can include or be connected to memory of client device 102.

As described with respect to FIGS. 3A-3C, a user of client device 102 can provide an indication (e.g., indication 350 and/or indication 360) of a time period of a timeline of media item 121 that includes an interesting content segment. Client device 102 can transmit a notification of the indicated time period to platform 120, as described above. Time mark detection component 220 can detect that a time mark is added to (or is to be added to) a portion of the timeline of media item 121 corresponding to the time period of indication 350. Time mark detection component 220 can store an indication of a detected time mark at memory 250 as time mark(s) 252.

Time mark detection component 220 can detect that time marks have been added to a timeline of media item 121 by multiple users of platform 120. In one illustrative example, a creator associated with a media item 121 can provide media item 121 for access by users of platform 120, as described above. During an initial time period after the creator provides media item 121 for access by the users, a portion of the users can provide an indication of time marks for the timeline of media item 121, as described above. Time mark detection component 220 can store data associated with each time mark received from client devices 102 associated with the portion of users at memory 250 as time mark(s) 252. In some embodiments, the data associated with a respective time mark can include an indication of a time period of the timeline of media item 121 that corresponds to the indicated time mark. The data can also include data associated with the respective user of platform 120 that provided the time mark, in some embodiments. For example, the data can include an indication of one or more characteristics associated with the user, such as one or more interests of the user, one or more creators and/or channels that the user subscribes to via the platform 120, one or more social groups maintained by the platform 120 to which the user is associated, etc.

Figure 4:
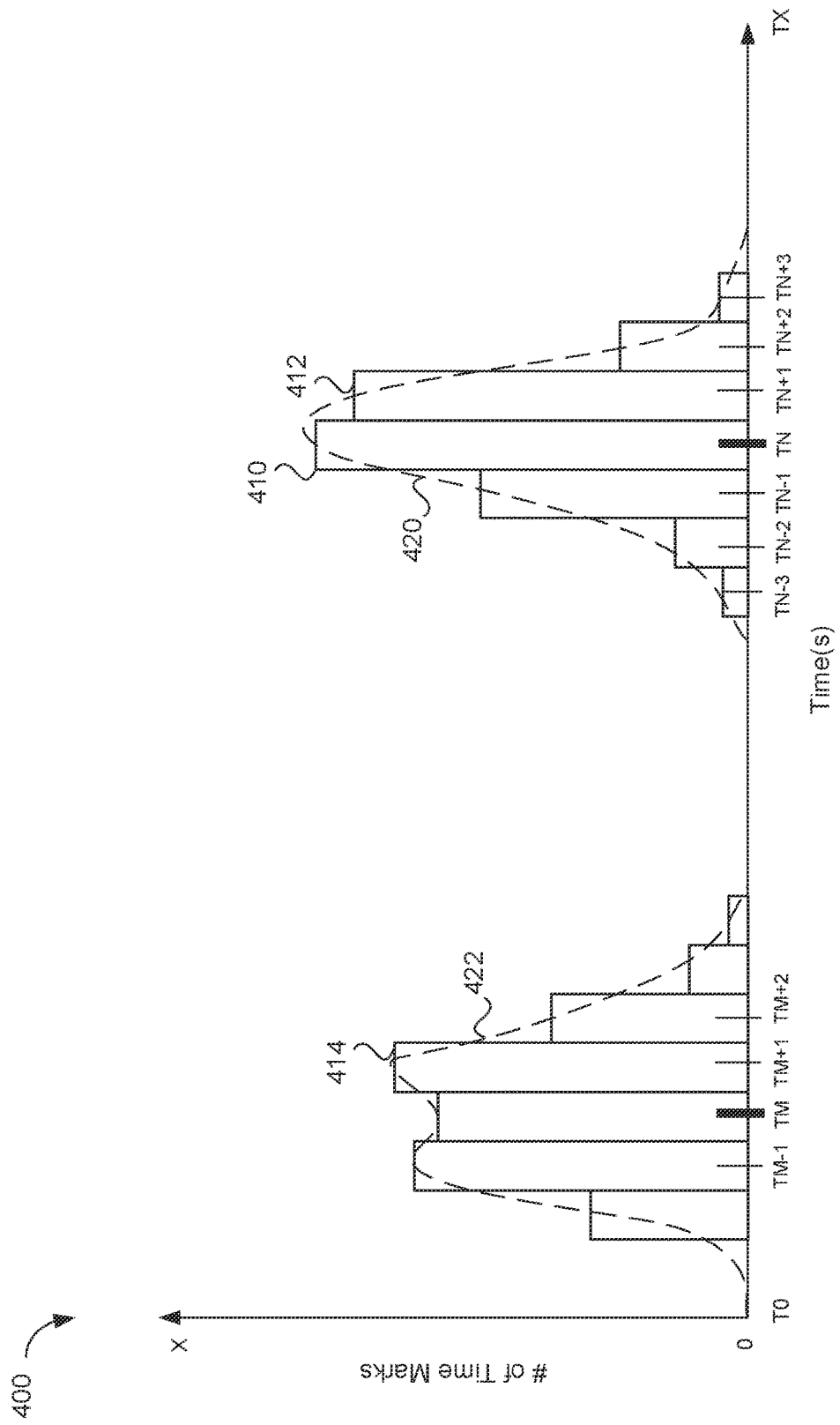
FIG. 4 illustrates an example time marking histogram data structure associated with a media item, in accordance with implementations of the present disclosure.

In some embodiments, time mark detection component 220 can maintain one or more data structures to track each time mark provided by users of platform 120 for media item 121. In some embodiments, the data structure can include or otherwise correspond to a histogram. FIG. 4 illustrates an example time marking histogram 400 associated with media item 121, in accordance with implementations of the present disclosure. As illustrated in FIG. 4, a first axis (e.g., an x-axis) of histogram 400 can correspond to a length of the timeline of media item 121. For example, one or more initial values of the first axis can correspond to the initial time period of the timeline of media item 121 (e.g., time T0). Values of the first axis can increase from the one or more initial values to eventually correspond to the final time period of the timeline of media item 121 (e.g., time TX). Each portion of the first axis can correspond to a respective time period of the timeline of media item 121. A second axis (e.g., a y-axis) of histogram 400 can correspond to a number of time marks provided by users of platform 120 for each respective time period of the timeline of media item 121.

Time mark detection component 220 can update histogram 400 to include data points associated with each time mark detected from client devices 102. As each data point is added to histogram 400, a number of time marks for a respective time period corresponding to the respective data point can be increased. For instance, if time mark detection component 220 detects that a time mark is added for a time period of the timeline that corresponds to time TN, time mark detection component 220 can update histogram 400 to increase the number of time marks associated with time period TN (e.g., by a value of one).

It should be noted that histogram 400 and embodiments described with respect to FIG. 4 are for purposes of example and illustration only. In some embodiments, time mark detection component 220 can maintain a histogram to track the time marks detected for each time period of the timeline of media item 121. In other or similar embodiments, time mark detection component 220 can maintain one or more other data structures to track the time marks detected for each time period of the timeline of media item 121. Such data structures may include the same information, or different and/or additional information, that is described with respect to histogram 400.

Referring back to FIG. 2, time mark aggregator component 222 can be configured to determine an aggregate time mark based on one or more time marks detected by time mark detection component 220. In an illustrative example, multiple users of client device 102 may find a particular content segment of media item 121 to be interesting and may provide an indication of a time mark for a time period associated with the particular content segment, in accordance with previously described embodiments. One or more of the users that find the particular content segment to be interesting may provide an indication of the time mark at a time period that corresponds to a starting point of the content segment. However, one or more other users that find the particular content segment to be interesting may provide an indication of the time mark at a time period that is slightly prior to or slightly after a time period corresponding to the starting point of the content segment. Accordingly, time mark aggregator component 222 can be configured to determine the time period of the timeline for media item 121 that corresponds to the starting point of the particular content segment in view of the time marks provided by the users of platform 120.

In some embodiments, time mark aggregator component 222 can initiate one or more operations to determine one or more aggregate time mark(s) for the media item 121 in response to determining that a time mark criterion is satisfied. The time mark criterion can be satisfied if a threshold number of time marks are received for a particular media item 121, in some embodiments. In other or similar embodiments, the time mark criterion can be satisfied if a threshold amount of time has passed since a creator associated with the media item 121 provided the media item 121 to platform 120.

In some embodiments, time mark aggregator component 222 can determine an aggregate time mark for media item 121 by analyzing the time periods of the timeline of media item 121 that are associated with a highest number of time marks. For example, in response to determining that the time mark criterion is satisfied, time mark aggregator component 222 can identify one or more time periods of the timeline of media item 121 that are associated with a highest number of time marks. As illustrated in FIG. 4, a time period 410 at or around time TN has a largest number of time marks than other time periods of the timeline. Accordingly, time mark aggregator component 222 can determine that time period 410 is associated with the highest number of time marks.

After identifying the time period associated with the highest number of time marks, time mark aggregator component 222 can determine one or more additional time periods that have a high number of time marks and can determine whether the one or more additional time periods are within a threshold time window associated with the time period 410 having the highest number of time marks. A threshold time window corresponds to a window of time that includes time periods that are likely to correspond to the same content segment of media item 121. In some embodiments, the threshold time window can be defined by a developer or operator associated with platform 120. In other or similar embodiments, the threshold time window can be determined in view of experimental data and/or data collected during operation of platform 120 (e.g., run-time data, etc.). In accordance with the example illustrated in FIG. 4, time mark aggregator component 222 can determine that time period 412 is associated with a second highest number of time marks and time period 414 is associated with a third highest number of time marks. Time mark aggregator component 222 can determine whether time period 412 and/or time period 414 is included in the threshold time window associated with time period 410 by determining whether a distance between time period 410 and time period 412 and/or time period 414 falls below a threshold distance. In an illustrative example, the threshold distance associated with the threshold time window can be approximately 4 seconds. As illustrated in FIG. 4, time period 410 can reside at time TN of the timeline for media item 121 and time period 412 can reside at time TN+1 of the timeline for media item 121. As a distance between time period 410 and time period 412 is approximately one second, time mark aggregator component 222 can determine that time period 412 is included in the threshold time window. As also illustrated in FIG. 4, time period 414 can reside at time TM+1 of the timeline for media item 121. A distance between time TN and time TM+1 of the timeline can larger than four seconds and accordingly, time mark aggregator component 222 can determine that time period 414 is not included (e.g., is outside of) the threshold time window associated with time period 410.

Responsive to determining that time period 410 and time period 412 are included within the same threshold time window, time mark aggregator component 222 can determine each time period that is to be included in the threshold time window. For example, as illustrated in FIG. 4, time periods associated with times TN−2, TN−3, TN+2, and TN+3 of the timeline can each be associated with time marks. A distance between time period 410 and time periods associated with times TN−2 and TN+2 can be approximately 2 seconds. A distance between time period 410 and time periods associated with times TN−3 and TN+3 can be approximately 3 seconds. As such distances are less than 4 seconds (e.g., the threshold distance), time mark aggregator component 222 can determine that each time period is included in the threshold time window associated with time period 410.

Responsive to determining that time period 410 and time period 414 are not included in the same threshold time window, time mark aggregator component 222 can determine that time period 414 is associated with an additional threshold time window that is distinct from the threshold time window for time period 410. Time mark aggregator component 222 can determine the time periods that are to be included in the additional threshold time window associated with time period 414 as described above. For example, time mark aggregator component 222 can determine that time periods associated with times TM, TM+2, TM−1, and so forth are to be included in the additional threshold time window.

Time mark aggregator component 222 can determine a frequency distribution of time marks associated with the time periods included in each respective threshold time window. In an illustrative example, time mark aggregator component 222 can determine a Gaussian distribution or another type of distribution corresponding to the frequency of time marks for each time period in a respective threshold time window. Distribution curve 420 indicates the determined distribution associated with the time periods of the time window for time period 410 and distribution curve 420 indicates the determined distribution associated with the tie periods of the time window for time period 414. Time mark aggregator 222 can determine a value for an aggregate time mark associated with each threshold time window in view of data points of distribution curves 420 and 422. The data points of distribution curves 420 and 422 can correspond to a normalized number of time marks associated with each respective time period included in the respective threshold time window. In some embodiments, the aggregate time mark value can correspond to one or more of an average value of at least a subset of the data points associated with distribution curves 420 and/or 422, a maximum value of at least a subset of the data points associated with distribution curves 420 and/or 422, a median value of each of the set of data points associated with distribution curves 420 and/or 422 and/or a mode value of each of the set of data points associated with distribution curves 420 and/or 422. In an illustrative example, time mark aggregator component 222 can determine that the aggregate time mark associated with the threshold time window for time period 410 corresponds to time TN of the timeline of media item 121. In another illustrative example, time mark aggregator component 222 can determine that the aggregate time mark associated with the threshold time window for time period 414 corresponds to time TM of the timeline of media item 121. In response to determining values of one or more aggregate time marks, as described above, time mark aggregator component 222 can store the determined values as aggregate time mark(s) 254 in memory 250.

Referring back to FIG. 2, bookmarking component 224 can determine at least one content segment of the media item that is to be associated with a bookmark for a timeline of media item 121. As indicated above, aggregate time mark(s) 254 can be determined in view of distribution curves 420 and/or 422. Bookmarking component 224 can identify a time period of the timeline of media item 121 that corresponds to the aggregate time mark(s) 254 and can determine a content segment that is included at the identified time period. In accordance with the previous illustrative examples, time mark aggregator component 222 can determine that aggregate time mark(s) 254 correspond to times TM and TN of the timeline of media item 121. Bookmarking component 224 can determine one or more content segments that are included in time periods associated with times TM and TN and can associate each determined content segment with a bookmark. Bookmarking component 224 can store an indication of each bookmark as bookmark(s) 152 at memory 250.

In some embodiments, platform 120 can receive a request to access media item 121 from a client device 102 (e.g., after bookmarking component 224 has associated one or more content segments with bookmark(s) 152). Platform 120 can provide the client device 102 with access to media item 121 and can transmit an indication of bookmark(s) 152 associated with media item 121. Client device 102 can provide media item 121 via UI 310, in accordance with previously described embodiments. In some embodiments, client device 102 can also provide an indication of the bookmark(s) 152 with media item 121 via UI 310.

Figure 5:
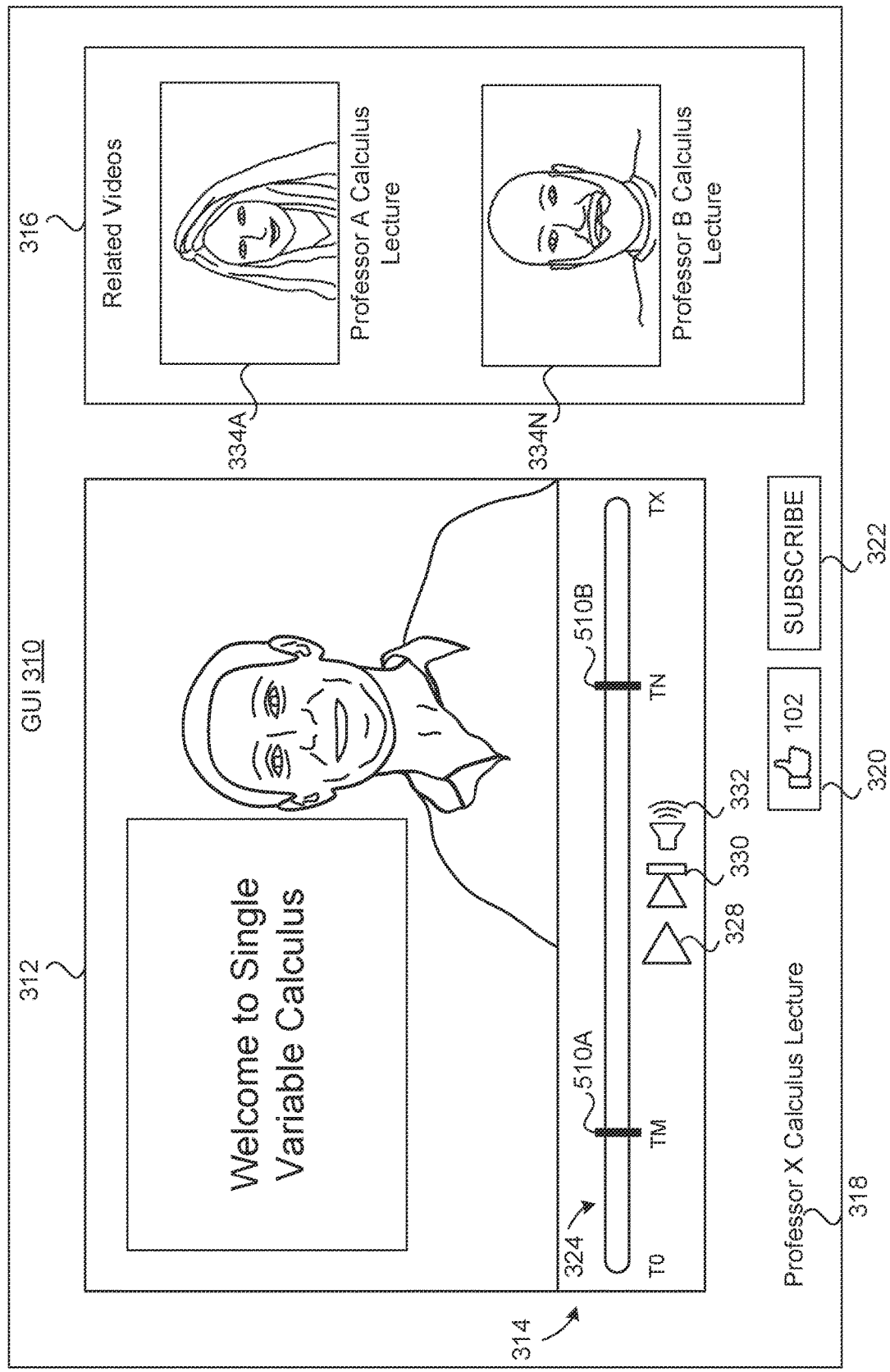
FIG. 5 illustrates an example of a bookmark for a media item in view of crowd source-based time marking of the media item, in accordance with implementations of the present disclosure.

FIG. 5 illustrates an example of UI 310 including bookmark(s) 152 for media item 121, in accordance with implementations of the present disclosure. Bookmark(s) 152 can be determined in view of crowd source-based time marking of media item 121, in accordance with embodiments described above. As illustrated in FIG. 5, second section 314 of UI 310 can include one or more UI elements 510 indicating bookmark(s) 152 determined for content segments of media item 121, as described above. A user associated with client device 102 can engage with (e.g., click, select, tap, etc.) UI element(s) 510 to initiate playback of the content segment corresponding with the respective bookmark 152. For example, a user can engage with UI element 510A to initiate playback of the content segment included in a time period at time TM of the timeline. As described previously, the content segment included in the time period at time TM can be designated as an interesting content segment by other users of platform 120. In another example, the user can engage with UI element 510B to initiate playback of the content segment included in a time period at time TN of the timeline. Accordingly, users of platform 120 can identify and initiate playback of content segments of a media item 121 that are designated as interesting by other users of platform 120 without consuming all of the content segments of media item 121.

In some embodiments, UI 310 can include one or more additional UI elements (not shown) that provide information associated with the content segment associated with UI element(s) 510. For example, the one or more additional UI elements can include an indication of a description associated with the content segment or an indication of details associated with the content of the content segment (e.g., a name of characters or actors depicted in the content of the content segment, a location associated with the content of the content segment, etc.). In some embodiments, platform 120 and/or client device 102 can update UI 310 to include the one or more additional UI elements, for example, in response to detecting that a user has engaged with (e.g., tapped, selected, clicked, hovered over, etc.) UI element(s) 510.

In some embodiments, the user of client device 102 may find another content segment of media item 121 to be interesting (e.g., that is not highlighted by UI elements 510). The user can provide an indication of a time period of the timeline of media item 121 that includes the interesting content segment, in accordance with previously described embodiments. For example, the user can engage with one or more of UI elements 324 and/or UI element 352 of UI 310 to provide an indication (e.g., indication 350 and/or indication 360) of a time period of the timeline of media item 121 that includes an interesting content segment. Time mark detection component 220 can update the one or more data structures associated with media item 121 to include a data point associated with the provided indication, as described above. In some embodiments, time mark aggregator component 222 can determine that the time mark of the provided indication is included in a time window associated with time period 410 and/or time period 414, as described with respect to FIG. 4. Time mark aggregator component 222 can determine that the aggregate time mark value of distribution 420 and/or distribution 422 is to remain the same or approximately similar, and accordingly, the bookmark(s) 152 associated with media item 121 are not to be updated, in some embodiments. In other or similar embodiments, time mark aggregator component 222 can determine that the time mark of the provided indication is not included in a time window associated with time period 410 and/or time period 414. Time mark aggregator component 222 can associated the time mark with another time window (e.g., that is outside of the time window associated with time periods 410 and/or 414). In response to determining that a time mark criterion is satisfied (e.g., a number of time marks for time periods within the other time window exceeds a threshold number), time mark aggregator component 222 can determine an aggregate time mark value for a distribution of the other time window. Bookmarking component 224 can determine a content segment that corresponds to the time period associated with the aggregate time mark value and can associate a bookmark 152 with the determined content segment, in accordance with previously described embodiments. In some embodiments, platform 120 can update UI 310 of client device 102 to include an indication of the new bookmark 152. In additional or alternative embodiments, platform 120 can provide other client devices 102 of an indication of the new bookmark 152 with access to media item 121 in response to a request from the other devices 102.

As indicated above, time mark detection component 220 can store data associated with each time mark received from client devices 102 at memory 250. In some embodiments, the data can include an indication of one or more characteristics associated with a user that provided the time mark, such as one or more interests of the user, one or more creators and/or channels that the user subscribes to via the platform 120, one or more social groups maintained by the platform 120 to which the user is associated, etc. In some embodiments, time mark aggregate component 222 may determine an aggregate time mark 254 in view of time marks provided by users associated with particular characteristics. For example, a user that provides an indication of a time mark, as described above, may be associated with a particular social group (e.g., a group of users that attend a particular university, etc.), as indicated in a user profile associated with the user. Time mark aggregator component 222 can identify, of the time marks received from client devices 102, time marks were provided by users that are associated with the particular social group and can determine the aggregate time mark(s) 254 based on the identified time marks. Bookmarking component 224 can associate a content segment corresponding to the aggregate time mark(s) 254, as described above, and can store an indication of a bookmark for the content segment with an indication of the particular social group at memory 250. In response to receiving a request to access media item 121 from a client device 102, platform 120 can determine whether the user associated with the client device 102 is associated with the particular social group. If the user is associated with the particular social group, the platform 120 can provide an indication of the bookmark(s) 152 corresponding to the particular social group to the client device 102 with access to the media item 121, as described above. If the user is not associated with the particular social group, the platform 120 may not provide an indication of the bookmark(s) 152 and/or may provide an indication of other bookmark(s) 152 corresponding to other characteristics associated with the user (e.g., instead of the bookmark(s) 152 corresponding to the particular social group).

In some embodiments, time marking engine 151 can update one or more bookmarks 152 associated with a media item 121 in view of a behavior of a user that is presented such bookmarks. For example, after UI elements 510A and/or 510B are presented for a user accessing media item 121, the user may engage with a portion of UI element 324 to indicate another content segment of the media item that is interesting to the user. In some embodiments, time marking engine 151 can update histogram 400 in view of the time mark provided by the user and can update bookmark(s) 152, in view of the time mark, as described herein. In other or similar embodiments, the user may not engage with a UI element 510A and/or 510B while consuming media item 121. Following completion of one or more content segments of media item 121, the client device 102 associated with the user may transmit a notification to platform 120 to indicate that the user did not engage with UI elements 510A and/or 510B. Time marking engine 151 can use the indication to track a number of users that do not engage with UI elements 510A and/or 510B and, in response to determining that a threshold number of users did not engage with such UI elements, time marking engine 151 can remove an association between the content segment and a bookmark 152.

Figure 6:
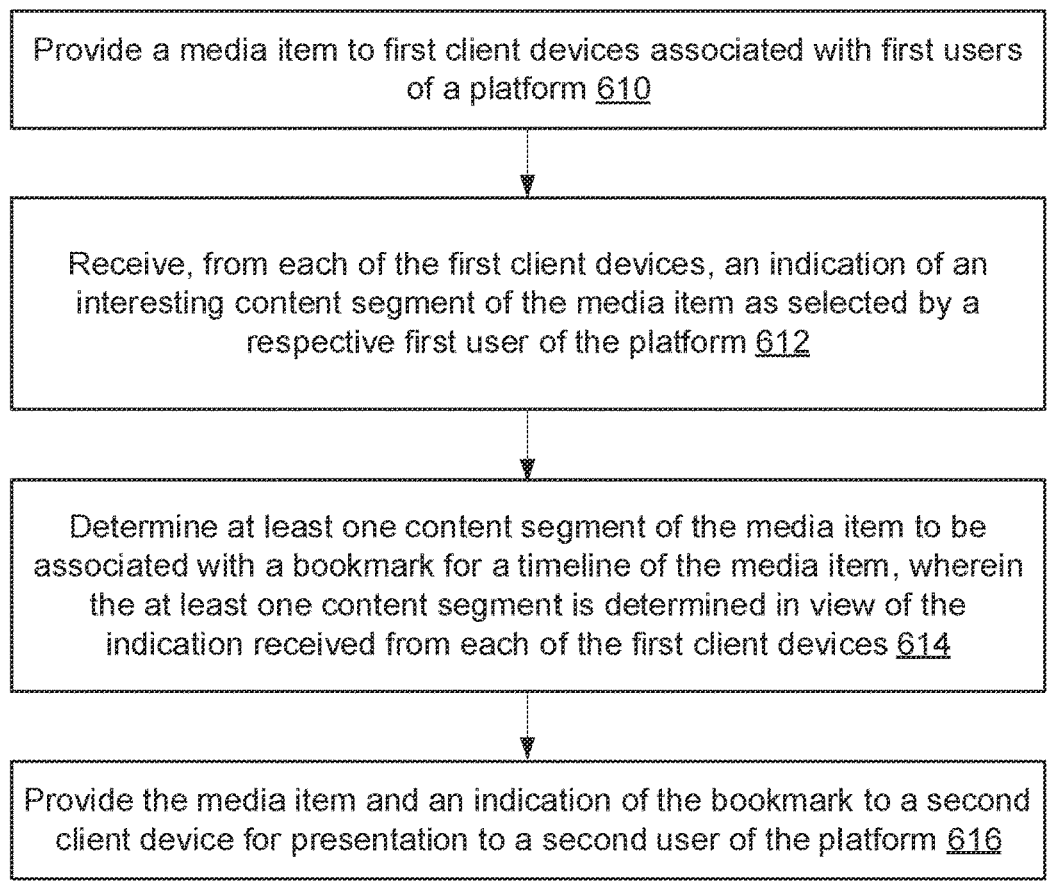
FIG. 6 depicts a flow diagram of an example method for crowd source-based time marking of media items at a platform, in accordance with implementations of the present disclosure.

FIG. 6 depicts a flow diagram of an example method 600 for crowd source-based time marking of media items at a platform, in accordance with implementations of the present disclosure. Method 600 can be performed by processing logic that can include hardware (circuitry, dedicated logic, etc.), software (e.g., instructions run on a processing device), or a combination thereof. In one implementation, some or all of the operations of method 600 can be performed by one or more components of system 100 of FIG. 1. In some embodiments, some or all of the operations of method 600 can be performed by time marking engine 151, as described above.

At block 610, processing logic provides a media item to first client devices associated with first users of a platform. The platform cam correspond to platform 120 and the media item can correspond to media item 121, in some embodiments. Media item 121 can include at least one of a video item or an audio item, in some embodiments. The first client devices can correspond to one or more of client device(s) 102, as described above. In some embodiments, the first users can include users that access the media item (e.g., media item 121) within a particular amount of time after a creator associated with the media item provides (e.g., uploads) the media item to platform 120 for access by users of platform 120.

At block 612, processing logic receives, from each of the first client devices, an indication of an interesting content segment of the media item as selected by a respective first user of the platform. The received indications can correspond to indications 350 and/or 360, as described above.

At block 614, processing logic determines at least one content segment of the media item to be associated with a bookmark for a timeline of the media item. The at least one content segment can be determined in view of the indication received from each of the first client devices. In some embodiments, processing logic can update a data structure associated with the media item to include one or more data items each corresponding to a respective time period of the media item that includes the interesting content segment of the indication received from a respective first client device of the first client devices. The data structure can correspond to histogram 400, in some embodiments, and the data items can correspond to data points of histogram 400. Processing logic can determine the at least one content segment of the media item to be associated with a bookmark for the media item timeline by identifying one or more entries of the data structure that include a set of data items that satisfies a data item criterion. An entry can satisfy the data item criterion if it is determined that at least one of a number of data items of the set of data items satisfies a threshold number or a distance between a minimum value of the set of data items and a maximum value of the set of data items falls below a threshold distance (e.g., the set of data items are each included within the same threshold time window). Processing logic can determine an aggregated data value in view of the set of data items. The aggregated data value can correspond to at least one of an average value of at least a subset of the set of data items, a maximum value of at least a subset of the set of data items, a median value of the set of data items, or a mode value of the set of data items. Processing logic can identify the respective time period of the time line of the media item that corresponds to a respective data item having the determined aggregated data value. The identified respective time period can include the at least one content segment of the media item to be associated with the bookmark for the timeline of the media item. At block 616, processing logic provides the media item and an indication of the bookmark to a second client device for presentation to a second user of the platform.

In some embodiments, processing logic can receive, from a third client device, an indication of an interesting content segment of the media item as selected by a respective third user of the platform. The indicated interesting content segment can correspond to the same interesting content segment indicated by one or more of the first users or a different interesting content segment. Processing logic can determine whether a distance between a first time period of the timeline of the media item that includes the interesting content segment of the indication received from the third client device and a second time period of the timeline of the media item that includes the at least one content segment of the media item associated with the bookmark satisfies a distance criterion (e.g., whether the time periods including the content segments are within the same threshold time window). In response to determining that the distance between the first time period of the timeline and the second time period of the timeline satisfies the distance criterion, processing logic can determine at least one different content segment to be associated with the bookmark for the timeline of the media item in view of the indication received from the third client device and can update the bookmark to correspond to the at least one different content segment. Processing logic can provide an indication of the updated bookmark to at least one of the second client device for presentation to the second user of the platform or a fourth client device for presentation to a fourth user of the platform.

In response to determining that the distance between the first time period of the timeline and the second time period of the timeline does not satisfy the distance criterion (e.g., the time periods including the content segments are outside of the same threshold time window), processing logic can determine at least one additional content segment to be associated with an additional bookmark for the timeline of the media item in view of the indication received from the third client device. Processing logic can provide an indication of the additional bookmark to at least one of the second client device for presentation to the second user of the platform or a fourth client device for presentation to a fourth user of the platform.

Figure 7:
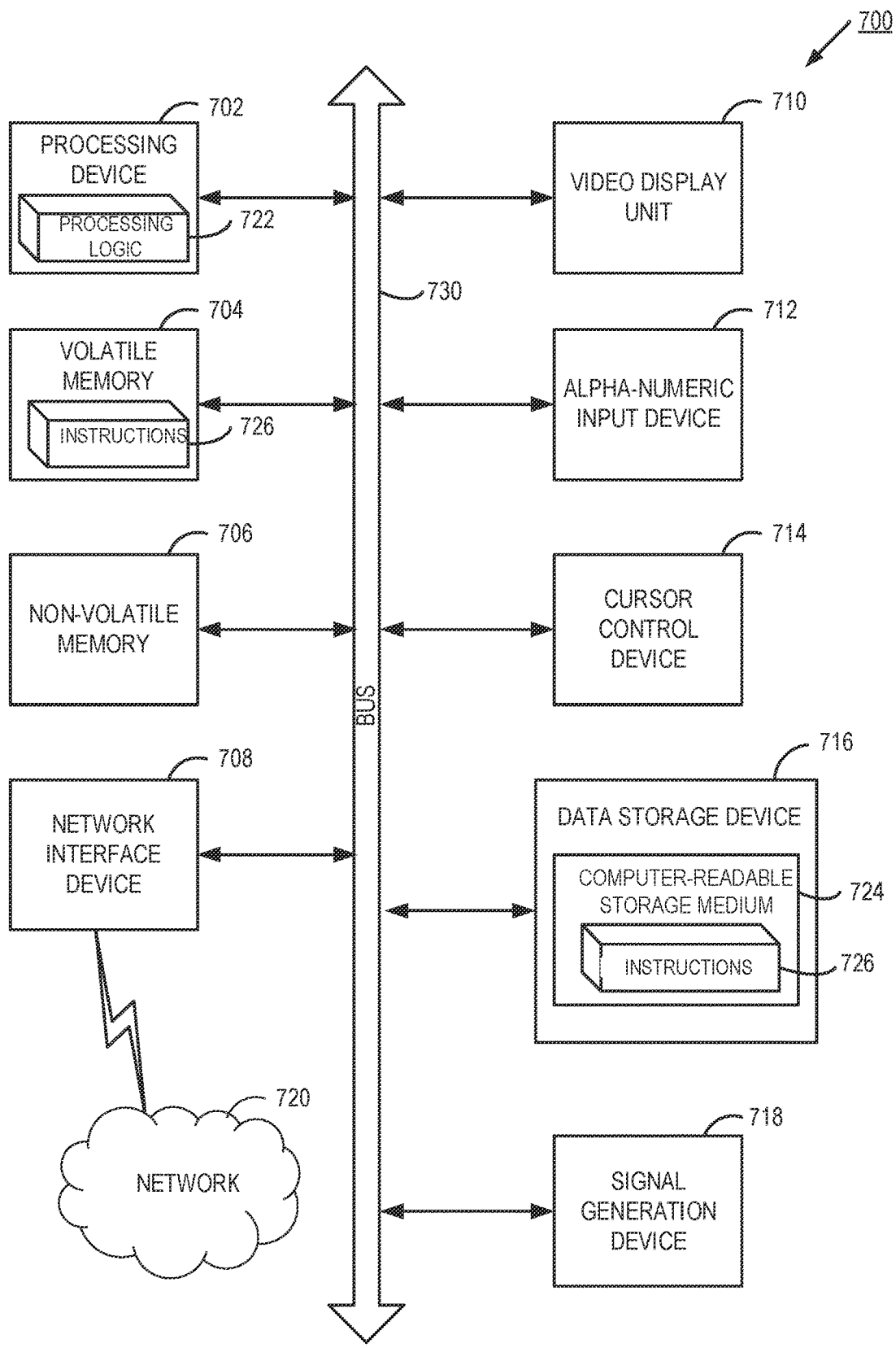
FIG. 7 is a block diagram illustrating an exemplary computer system, in accordance with implementations of the present disclosure.

FIG. 7 is a block diagram illustrating an exemplary computer system 700, in accordance with implementations of the present disclosure. The computer system 700 can correspond to platform 120 and/or client devices 102A-N, described with respect to FIG. 1. Computer system 700 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 740.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 can also be one or more special-purpose processing devices such as an application specific integrated circuit (ASIC), a field programmable gate array (FPGA), a digital signal processor (DSP), network processor, or the like. The processor 702 is configured to execute instructions 705 (e.g., for providing crowd source-based time marking of media items at a platform) for performing the operations discussed herein.

The computer system 700 can further include a network interface device 708. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 720 (e.g., a speaker).

The data storage device 718 can include a non-transitory machine-readable storage medium 724 (also computer-readable storage medium) on which is stored one or more sets of instructions 705 (e.g., for providing crowd source-based time marking of media items at a platform) embodying any one or more of the methodologies or functions described herein. The instructions can also reside, completely or at least partially, within the main memory 704 and/or within the processor 702 during execution thereof by the computer system 700, the main memory 704 and the processor 702 also constituting machine-readable storage media. The instructions can further be transmitted or received over a network 730 via the network interface device 708.

In one implementation, the instructions 705 include instructions for crowd source-based time marking of media items at a platform. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   providing a media item to a plurality of client devices associated with users of a platform, wherein each of the users associated with the plurality of client devices share at least one common characteristic;
   receiving, from each of the plurality of client devices, a request to bookmark an interesting content segment of the media item as selected by a respective user of the platform, wherein each request received from a respective client device of the plurality of client devices indicates a time period of a timeline of the media item associated with the interesting content segment;
   responsive to determining that a number of received requests to bookmark the interesting content segment from users associated with the at least one common characteristic satisfies one or more request criteria, identifying a range of time periods associated with the interesting content segment based on the time period indicated by each of the received requests;
   associating at least one content segment within the range of time periods with a bookmark for the timeline of the media item; and
   providing the media item and an indication of the bookmark to an additional client device for presentation to an additional user of the platform associated with the at least one common characteristic.

2. The method of claim 1, further comprising:
   updating a data structure associated with the media item to include one or more data items each corresponding to the time period of the timeline of the media item indicated by each request received from the plurality of client devices.

3. The method of claim 2, wherein determining the at least one content segment of the media item to be associated with the bookmark for the timeline of the media item comprises:
   identifying one or more entries of the data structure including a set of data items that satisfies a data item criterion;
   determining an aggregated data value in view of the set of data items, wherein the aggregated data value corresponds to at least one of an average value of at least a subset of the set of data items, a maximum value of at least a subset of the set of data items, a median value of each of the set of data items, or a mode value of the set of data items; and
   identifying a respective time period of the timeline of the media item that corresponds to a respective data item having the determined aggregated data value, wherein the identified respective time period is within the range of time periods and includes the at least one content segment associated with the bookmark for the timeline of the media item.

4. The method of claim 3, wherein the set of data items satisfies the data item criterion in response to a determination that at least one of a number of data items of the set of data items exceeds a threshold number of data items or a distance between a minimum value of the set of data items and a maximum value of the set of data items falls below a threshold distance.

5. The method of claim 1, further comprising:
   receiving, from the additional client device, an indication of an interesting content segment of the media item as selected by the additional user of the platform;
   determining whether a distance between a first time period of the timeline of the media item that includes the interesting content segment of the indication received from the additional client device and a second time period of the timeline of the media item that includes the at least one content segment of the media item associated with the bookmark satisfies a distance criterion;
   responsive to determining that the distance between the first time period of the timeline and the second time period of the timeline satisfies the distance criterion, determining at least one different content segment to be associated with the bookmark for the timeline of the media item in view of the indication received from the additional client device;
   updating the bookmark for the timeline of the media item to correspond to the at least one different content segment; and providing an indication of the updated bookmark to another additional client device for presentation to a another additional user of the platform.

6. The method of claim 5, further comprising:
responsive to determining that the distance between the first time period of the timeline and the second time period does not satisfy the distance criterion, determining at least one additional content segment to be associated with an additional bookmark for the timeline of the media item in view of the indication received from the additional client device; and
providing an indication of the additional bookmark to the other additional client device for presentation to the other additional user of the platform.

7. The method of claim 1, wherein the media item comprises at least one of a video item or an audio item.

8. A system comprising:
a memory device; and
a processing device coupled to the memory device, the processing device to perform operations comprising:
providing a media item to a plurality of client devices associated with users of a platform, wherein each of the users associated with the plurality of client devices share at least one common characteristic;
receiving, from each of the plurality of client devices, a request to bookmark an interesting content segment of the media item as selected by a respective user of the platform, wherein each request received from a respective client device of the plurality of client devices indicates a time period of a timeline of the media item associated with the interesting content segment;
responsive to determining that a number of received requests to bookmark the interesting content segment from users associated with the at least one common characteristic satisfies one or more request criteria, identifying a range of time periods associated with the interesting content segment based on the time period indicated by each of the received request;
associating at least one content segment within the range of time periods with a bookmark for the timeline of the media item; and
providing the media item and an indication of the bookmark to an additional client device for presentation to an additional user of the platform associated with the at least one common characteristic.

9. The system of claim 8, wherein the operations further comprise:
updating a data structure associated with the media item to include one or more data items each corresponding to the time period of the timeline of the media item indicated by each request received from the plurality of client devices.

10. The system of claim 9, wherein determining the at least one content segment of the media item to be associated with the bookmark for the timeline of the media item comprises:
identifying one or more entries of the data structure including a set of data items that satisfies a data item criterion;
determining an aggregated data value in view of the set of data items, wherein the aggregated data value corresponds to at least one of an average value of at least a subset of the set of data items, a maximum value of at least a subset of the set of data items, a median value of each of the set of data items, or a mode value of the set of data items; and
identifying a respective time period of the timeline of the media item that corresponds to a respective data item having the determined aggregated data value, wherein the identified respective time period is within the range of time periods and includes the at least one content segment associated with the bookmark for the timeline of the media item.

11. The system of claim 10, wherein the set of data items satisfies the data item criterion in response to a determination that at least one of a number of data items of the set of data items exceeds a threshold number of data items or a distance between a minimum value of the set of data items and a maximum value of the set of data items falls below a threshold distance.

12. The system of claim 8, wherein the operations further comprise:
receiving, from the additional client device, an indication of an interesting content segment of the media item as selected by the additional user of the platform;
determining whether a distance between a first time period of the timeline of the media item that includes the interesting content segment of the indication received from the additional client device and a second time period of the timeline of the media item that includes the at least one content segment of the media item associated with the bookmark satisfies a distance criterion;
responsive to determining that the distance between the first time period of the timeline and the second time period of the timeline satisfies the distance criterion, determining at least one different content segment to be associated with the bookmark for the timeline of the media item in view of the indication received from the additional client device;
updating the bookmark for the timeline of the media item to correspond to the at least one different content segment; and
providing an indication of the updated bookmark to another additional client device for presentation to a another additional user of the platform.

13. The system of claim 12, wherein the operations further comprise:
responsive to determining that the distance between the first time period of the timeline and the second time period does not satisfy the distance criterion, determining at least one additional content segment to be associated with an additional bookmark for the timeline of the media item in view of the indication received from the additional client device; and
providing an indication of the additional bookmark to the other additional client device for presentation to the other additional user of the platform.

14. A non-transitory computer readable storage medium comprising instructions for a server that, when executed by a processing device, cause the processing device to perform operations comprising:
providing a media item to a plurality of client devices associated with users of a platform, wherein each of the users associated with the plurality of client devices share at least one common characteristic;
receiving, from each of the plurality of client devices, a request to bookmark an interesting content segment of the media item as selected by a respective user of the platform, wherein each request received from a respective client device of the plurality of client devices indicates a time period of a timeline of the media item associated with the interesting content segment;

responsive to determining that a number of received request to bookmark the interesting content segment from users associated with the at least one common characteristic satisfies one or more request criteria, identifying a range of time periods associated with the interesting content segment based on the time period indicated by each of the received requests;

associating at least one content segment within the range of time periods with a bookmark for the timeline of the media item; and providing the media item and an indication of the bookmark to an additional client device for presentation to an additional user of the platform associated with the at least one common characteristic.

15. The non-transitory computer readable storage medium of claim 14, wherein the operations further comprise:

updating a data structure associated with the media item to include one or more data items each corresponding to the time period of the timeline of the media item indicated by each request received from the plurality of client devices.

16. The non-transitory computer readable storage medium of claim 15, wherein determining the at least one content segment of the media item to be associated with the bookmark for the timeline of the media item comprises:

identifying one or more entries of the data structure including a set of data items that satisfies a data item criterion;

determining an aggregated data value in view of the set of data items, wherein the aggregated data value corresponds to at least one of an average value of at least a subset of the set of data items, a maximum value of at least a subset of the set of data items, a median value of each of the set of data items, or a mode value of the set of data items; and identifying a respective time period of the timeline of the media item that corresponds to a respective data item having the determined aggregated data value, wherein the identified respective time period is within the range of time periods and includes the at least one content segment associated with the bookmark for the timeline of the media item.

17. The non-transitory computer readable storage medium of claim 16, wherein the set of data items satisfies the data item criterion in response to a determination that at least one of a number of data items of the set of data items exceeds a threshold number of data items or a distance between a minimum value of the set of data items and a maximum value of the set of data items falls below a threshold distance.

18. The non-transitory computer readable storage medium of claim 14, wherein the operations further comprise:

receiving, from the additional client device, an indication of an interesting content segment of the media item as selected by the additional user of the platform;

determining whether a distance between a first time period of the timeline of the media item that includes the interesting content segment of the indication received from the additional client device and a second time period of the timeline of the media item that includes the at least one content segment of the media item associated with the bookmark satisfies a distance criterion;

responsive to determining that the distance between the first time period of the timeline and the second time period of the timeline satisfies the distance criterion, determining at least one different content segment to be associated with the bookmark for the timeline of the media item in view of the indication received from the additional client device;

updating the bookmark for the timeline of the media item to correspond to the at least one different content segment; and providing an indication of the updated bookmark to another additional client device for presentation to a another additional user of the platform.

19. The non-transitory computer readable storage medium of claim 18, wherein the operations further comprise:

responsive to determining that the distance between the first time period of the timeline and the second time period does not satisfy the distance criterion, determining at least one additional content segment to be associated with an additional bookmark for the timeline of the media item in view of the indication received from the additional client device; and providing an indication of the additional bookmark to the other additional client device for presentation to the other additional user of the platform.

20. The non-transitory computer readable storage medium of claim 14, wherein the media item comprises at least one of a video item or an audio item.

* * * * *